United States Patent
Miyashita (10) Patent No.: US 11,144,614 B2
(45) Date of Patent: Oct. 12, 2021

(54) PROCESSING DEVICE OF A NEURAL NETWORK TO PROCESS IMAGE DATA

(71) Applicant: Toshiba Memory Corporation, Minato-ku (JP)

(72) Inventor: Daisuke Miyashita, Kawasaki (JP)

(73) Assignee: Toshiba Memory Corporation, Minato-ku (JP)

( * ) Notice: Subject to any disclaimer, the term of this patent is extended or adjusted under 35 U.S.C. 154(b) by 173 days.

(21) Appl. No.: 16/294,106

(22) Filed: Mar. 6, 2019

(65) Prior Publication Data

US 2019/0354569 A1    Nov. 21, 2019

(30) Foreign Application Priority Data

May 17, 2018 (JP) .............................. JP2018-095787

(51) Int. Cl.
| | | |
|---|---|---|
| G06F 17/16 | (2006.01) | |
| G06F 7/544 | (2006.01) | |
| G06N 5/04 | (2006.01) | |
| G06N 20/00 | (2019.01) | |

(52) U.S. Cl.
CPC ............ *G06F 17/16* (2013.01); *G06F 7/5443* (2013.01); *G06N 5/04* (2013.01); *G06N 20/00* (2019.01)

(58) Field of Classification Search
CPC ....... G06F 17/16; G06F 7/5443; G06N 20/00; G06N 5/04
See application file for complete search history.

(56) References Cited

U.S. PATENT DOCUMENTS

| | | | |
|---|---|---|---|
| 6,768,817 B1 | 7/2004 | Cheng et al. | |
| 9,600,763 B1 | 3/2017 | Kasagi | |
| 2017/0344876 A1* | 11/2017 | Brothers | G06N 3/0454 |
| 2018/0336462 A1* | 11/2018 | Brothers | G06N 3/04 |
| 2019/0130250 A1* | 5/2019 | Park | G06N 3/082 |
| 2019/0156201 A1* | 5/2019 | Bichler | G06N 3/063 |
| 2019/0347554 A1* | 11/2019 | Choi | G06N 3/04 |

FOREIGN PATENT DOCUMENTS

| | | |
|---|---|---|
| JP | 2003-509748 | 3/2003 |
| JP | 2017-078934 | 4/2017 |
| JP | 2018-066136 | 4/2018 |

OTHER PUBLICATIONS

A. Lavin et al., "Fast Algorithms for Convolutional Neural Networks", arXiv:1509.09308v2, 2015, 9 pages.

* cited by examiner

*Primary Examiner* — Michael D. Yaary
(74) *Attorney, Agent, or Firm* — Oblon, McClelland, Maier & Neustadt, L.L.P.

(57) ABSTRACT

According to one embodiment, a processing device includes: a first circuit configured to execute first processing using a first matrix to first data of a size of 5×5 within input data to generate second data; a second circuit configured to execute second processing using a second matrix to third data of a size of 3×3 to generate fourth data; a third circuit configured to execute a product-sum operation on the second data and the fourth data; and a fourth circuit configured to execute third processing using a third matrix on a result of the product-sum operation on the second data and the fourth data to obtain a first value corresponding to a result of a product-sum operation on the first data and the third data.

20 Claims, 7 Drawing Sheets

PROCESSING DEVICE OF A NEURAL NETWORK TO PROCESS IMAGE DATA

CROSS-REFERENCE TO RELATED APPLICATIONS

This application is based upon and claims the benefit of priority from prior Japanese Patent Application No. 2018-095787, filed May 17, 2018, the entire contents of which are incorporated herein by reference.

FIELD

Embodiments described herein relate generally to a processing device and a data processing method.

BACKGROUND

A computer system using neural network executes various types of calculation processing for provided data for inference and learning for the provided data.

DETAILED DESCRIPTION

A processing device, a data processing method, and a system according to an embodiment will be described with reference to the drawings.

In the description below, elements having the same functions and configurations will be denoted by the same reference symbols. In the embodiment below, if the reference numerals added to structural elements are accompanied by numbers or alphabetical characters for differentiation, such numbers or alphabetical characters may be omitted when differentiation is not needed for the structural elements.

In general, according to one embodiment, a processing device comprising: a first circuit configured to execute first processing using a first matrix to first data of a size of 5×5 within input data to generate second data; a second circuit configured to execute second processing using a second matrix to third data of a size of 3×3 to generate fourth data; a third circuit configured to execute a product-sum operation on the second data and the fourth data; and a fourth circuit configured to execute third processing using a third matrix on a result of the product-sum operation on the second data and the fourth data to obtain a first value corresponding to a result of a product-sum operation on the first data and the third data.

The first matrix is represented by equation (P1).

$$B^T = \begin{bmatrix} 0 & 1 & 0 & 0 & 0 \\ 1 & 0 & 1 & 0 & 0 \\ 1 & 0 & -1 & 0 & 0 \\ 1 & 0 & 0 & 0 & -1 \\ 0 & 0 & 0 & 1 & 0 \end{bmatrix} \quad (P1)$$

The second matrix is represented by equation (P2).

$$G = \begin{bmatrix} 0 & 1 & 0 \\ \frac{1}{2} & 0 & \frac{1}{2} \\ \frac{1}{2} & 0 & -\frac{1}{2} \\ 0 & 0 & 1 \\ 0 & 1 & 0 \end{bmatrix} \quad (P2)$$

Embodiment

The processing device, the data processing method, and the system according to the present embodiment will be described in detail with reference to FIG. 1 to FIG. 9.

(1) Configuration

A configuration of the processing device according to the present embodiment will be explained with reference to FIG. 1 to FIG. 3.

Figure 1:
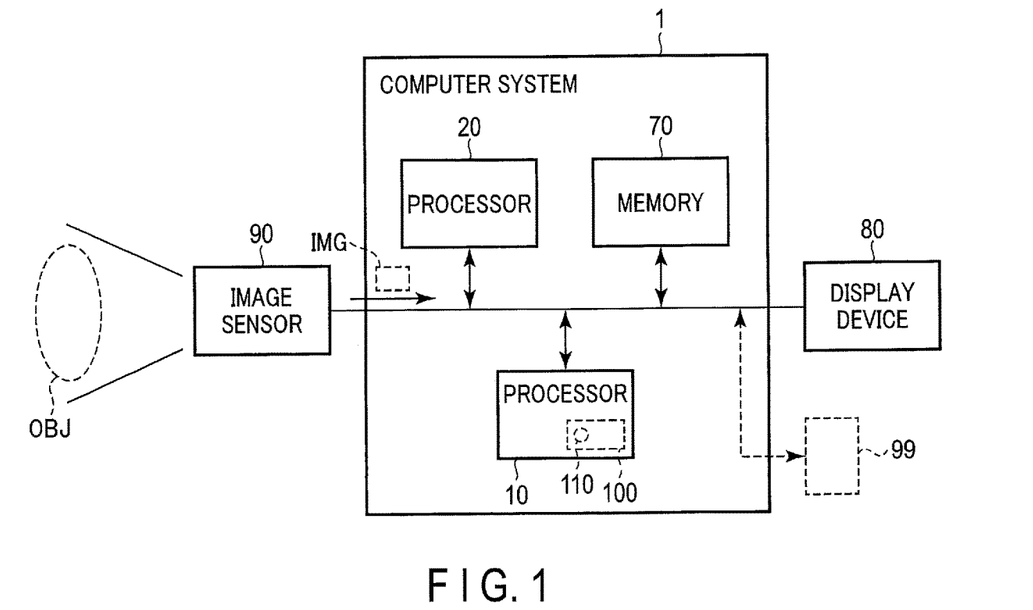
FIG. 1 is a diagram for explaining an example of a system including a processing device according to an embodiment.

FIG. 1 is a block diagram for explaining the system including the processing device according to the present embodiment.

A processing device (also referred to as a processing circuit, a calculation device, or a processor) 110 of the present embodiment is provided within a computer system 1. For example, the computer system 1 is an image recognition system.

As shown in FIG. 1, the computer system 1 is electrically coupled with an image sensor 90 via a cable and/or wireless communication. The computer system 1 receives image data of an object (article) OBJ imaged (captured) by the image sensor 90. The computer system 1 executes various types of processing to image data IMG. The image data IMG may be still image data or movie data.

The computer system 1 can display a result of processing relative to the image data IMG on a display device 80. The display device 80 is, for example, a liquid crystal display, or an organic EL display, etc. The display device 80 is electrically coupled with the computer system 1 via a cable and/or wireless communication.

At least one of the image sensor 90 and the display device 80 may be configured as a structural element of the computer system 1.

The computer system 1 includes at least processors 10 and 20, and a memory 70.

In the embodiment, the processor 10 is, for example, a GPU (Graphic Processing Unit). A GPU 10 executes various types of image processing relative to the image data IMG from the image sensor 90 and/or the memory 70. In the embodiment, the GPU 10 includes a neural network 100 described later.

The processor 20 is, for example, a CPU (Central Processing Unit). A CPU 20 can control the entire operation of the computer system 1. The CPU 20 can execute various types of calculation processing to control the GPU 10 and the memory 70.

The memory 70 can store the image data IMG from the image sensor 90, data generated by the GPU 10, and data generated by the CPU 20. The data generated by the GPU 10 and CPU 20 may include an intermediate result and a final result of various types of calculations, and an intermediate result and a final result of image processing. For example, the memory 70 includes at least one or more of a DRAM, an SRAM, an MRAM, a NAND-type flash memory, a resistance change type memory (for example, an ReRAM, a PCM (Phase Change Memory)), etc. A non-illustrated memory dedicated to the GPU 10 may be directly coupled with the GPU 10.

The image data IMG may be provided from a storage medium 99. The storage medium 99 is electrically coupled with the computer system 1 via a cable and/or wireless communication. The storage medium 99 may be any of a memory card, a USB memory, an SSD, an HDD, and an optical storage medium, etc.

Figure 2:
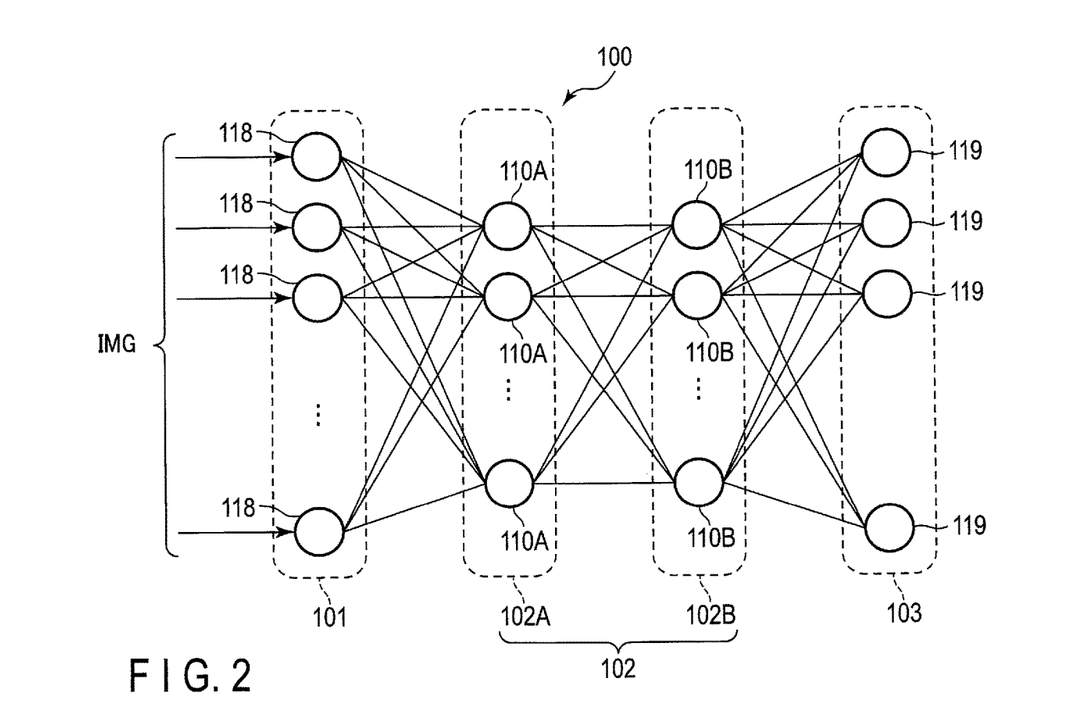
FIG. 2 is a diagram for explaining structure of a neural network in the processing device according to the embodiment.

FIG. 2 is a schematic diagram for explaining an example configuration of a neural network in the GPU according to the present embodiment.

In the GPU 10, the neural network 100 shown in FIG. 2 is used as a machine learning device. For example, the neural network 100 is a convolutional neural network (CNN).

The neural network 100 includes an input layer 101, a hidden layer (also referred to as an intermediate layer) 102, and an output layer (also referred to as a fully-connected layer) 103.

The input layer 101 receives the image data IMG (or part of the image data IMG).

The input layer 101 includes a plurality of processing devices (also referred to as neurons or neuron circuits) 118. In the input layer 101, each processing device 118 can extract (sample) a predetermined size of two-dimensional array data from the image data IMG. Each processing device 118 transmits the extracted data to the hidden layer 102. The data to be transmitted may be data extracted by the input layer 101 as is, or data subjected to any processing (for example, binarization) by the input layer 101.

Each of the processing devices 118 may extract (or receive) data at different coordinates (region) within the image data IMG. Two or more of the processing devices 118 may extract data at the same coordinates within the image data IMG. The input layer 101 also acts as a buffer and an interface for outputting two-dimensional data to the hidden layer 102.

The hidden layer 102 (102A, 102B) executes various types of calculation processing relative to data from the input layer 101.

The hidden layer 102 includes a plurality of processing devices 110 (110A, 110B). In the hidden layer 102, each processing device 110 executes a convolution operation (product-sum operation) using a predetermined parameter (for example, a weighting factor) relative to the provided data (also referred to as input data for differentiation). For example, each processing device 110 executes product-sum operation using mutually different parameters to the provided data.

The hidden layer 102 may be hierarchically structured. In this case, the hidden layer 102 includes a plurality of layers 102A and 102B (two layers in the example of FIG. 2).

Each processing device 110A of a first hidden layer 102A executes calculation processing relative to data from the input layer 101. Each processing device 110A transmits a calculation result to each processing device 110B in a second hidden layer. Each processing device 110B of the second hidden layer 102B executes predetermined calculation processing relative to input data that is the calculation result of each processing device 110A. Each processing device 110B transmits a calculation result to the output layer 103.

As described above, if the hidden layer 102 has a hierarchical structure, inference, learning/training, and classification abilities of the neural network 100 can be improved. The number of layers in the hidden layer 102 may be three or more, or may be one. One hidden layer may be configured to include a convolutional layer and pooling layer.

The output layer 103 receives results of various types of calculation processing executed by each processing device 110 of the hidden layer 102, and executes various types of processing.

The output layer 103 includes a plurality of processing devices 119. Each processing device 119 executes predetermined processing relative to a calculation result of the processing devices 110B. Via this processing, inference, learning, and classification for data provided to the neural network 100 can be performed based on the calculation result of the hidden layer 102. Each processing device 119 can hold and output an obtained processing result (classification result). The output layer 103 also acts as a buffer and an interface for outputting external to the neural network 100 the calculation result of the hidden layer 102.

The neural network 100 may be provided externally to the GPU 10.

In the computer system 1 according to the present embodiment, various types of calculation processing for image recognition/inference, and various types of calculation processing for machine learning of image recognition/inference (for example, deep learning) are executed by the convolutional neural network 100.

For example, in the image recognition system 1, a characteristic value of each of a plurality of regions (one or more pixels) within the image data IMG is calculated based on various types of calculation processing by the convolutional neural network 100 relative to the image data IMG. Based on the calculation result of the convolutional neural network 100, the image recognition system 1 can perform inference (recognition) and classification as to what an object OBJ is with high accuracy, or the image recognition system 1 can realize learning so that recognition/classification of the object (for example, an automobile, road, person, animal, face, building, etc.) within the image data IMG can be performed with high accuracy.

In the present embodiment, the processing device 110 (110A, 110B) of the convolutional neural network 100 includes one or more processing circuits, as described below.

Figure 3:
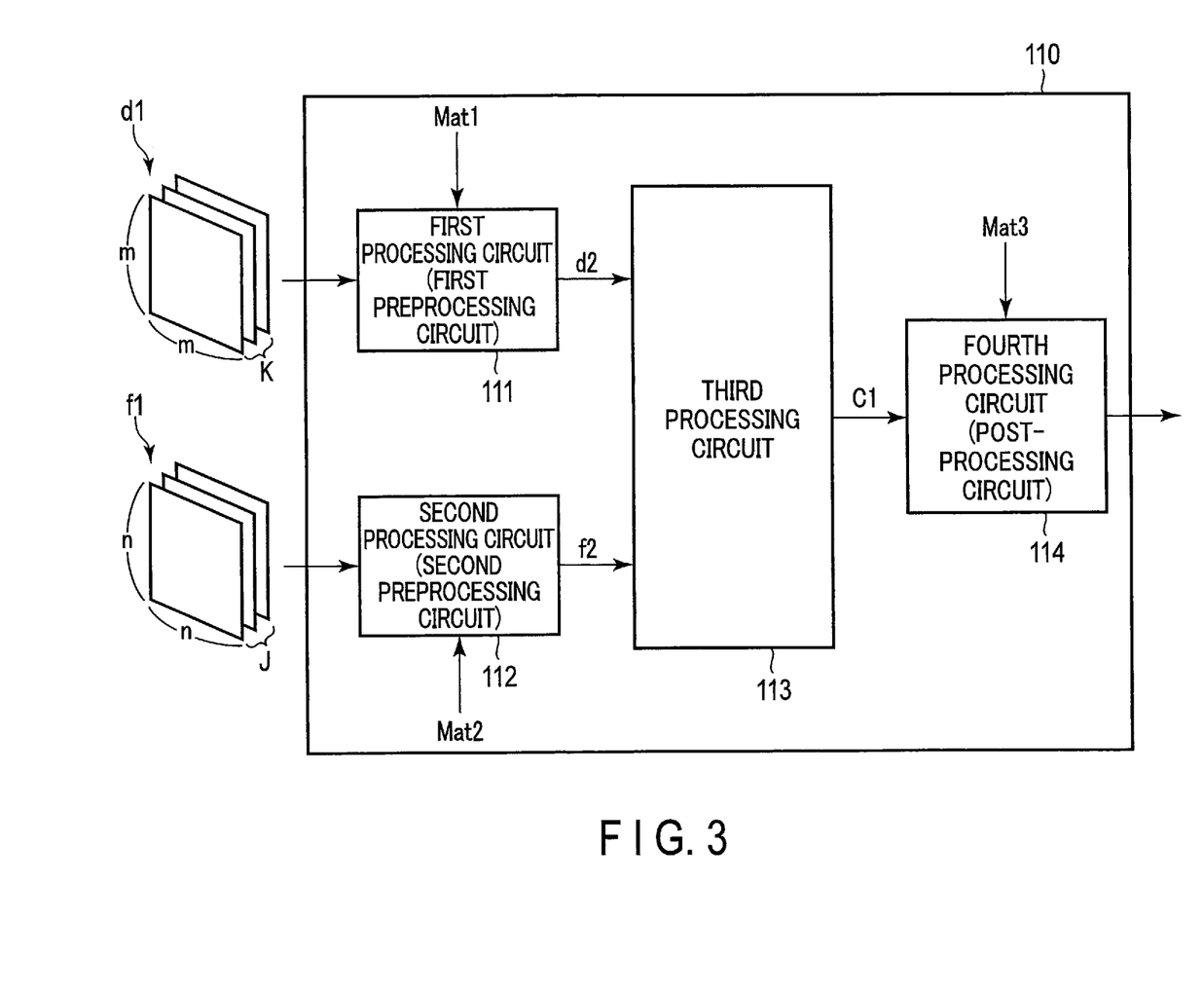
FIG. 3 is a diagram for explaining schematic structure of the processing device according to the embodiment.

FIG. 3 is a schematic diagram for explaining a basic configuration of the processing device according to the present embodiment.

As shown in FIG. 3, the processing device 110 of the present embodiment includes first, second, third, and fourth processing circuits 111, 112, 113, and 114.

The first processing circuit (hereinafter referred to as a first preprocessing circuit) 111 executes calculation processing (hereinafter referred to as first preprocessing) using a first matrix (a first conversion matrix) Mat 1 relative to provided data d1. Via this processing, data d2 is generated.

As described above, data d1 is data extracted from the image data IMG. The data d2 is data in which each value of data d1 is converted by the calculation processing subjected to the first data d1.

The second processing circuit (hereinafter referred to as a second preprocessing circuit) 112 executes calculation processing (hereinafter referred to as second preprocessing) using a second matrix (a second conversion matrix) Mat 2 relative to provided filter f1. Via this processing, filter f2 is generated.

Filter f1 is provided from a memory region of the GPU 10, a memory region of the CPU 20, or the memory 70, for example. Filter f1 is a spatial filter (two-dimensional array digital data). Filter f1 has a coefficient according to various types of processing to be executed on image data. Filter f2 is a filter in which the coefficient, the number of rows and columns of filter f1 have been converted via the preprocessing. Filter f2 is a spatial filter (two-dimensional array digital data).

The third processing circuit (hereinafter referred to as a product-sum operation circuit) 113 executes a product-sum operation on the preprocessed data d2 and the preprocessed filter f2. The product-sum operation circuit 113 obtains a result C1 of the product-sum operation.

The fourth processing circuit (hereinafter referred to as a post-processing circuit) 114 executes conversion processing (hereinafter referred to as post-processing) using a third matrix (a third conversion matrix) Mat 3 relative to the result C1 of the product-sum operation. Via this processing, a calculation value equivalent to the result of the product-sum operation (convolution operation) on data d1 and filter f1 is generated.

The obtained calculation value (the calculation result of the product-sum operation on data d1 and filter f1) is transmitted from the post-processing circuit 114 to a subsequent circuit (for example, other processing device 110).

The matrix Mat 1, Mat 2 is provided from the memory region of the GPU 10, the memory region of the CPU 20, or the memory 70, for example. The matrix Mat 1, Mat 2 may be provided from another device (not illustrated) coupled to the computer system 1.

In accordance with the configuration of the neural network 100, the inner configuration of the processing device 110B in the hidden layer 102 may be the same as or different from the inner configuration of the processing device 110A. For example, the processing device 110B may be configured to directly execute the product-sum operation on input data d1 and filter f1. The processing device 110B may perform calculation processing substantially equivalent to the product-sum operation on data d1 and filter f1 by processing (calculation and conversion) different from the preprocessing or post-processing by the processing device 110A. In the hidden layer 102A, the inner configuration may be different between the processing devices 110A. In the hidden layer 102B, the inner configuration may be different between the processing devices 110B.

(2) Basic Concept

The basic concept of the processing device according to the present embodiment (and image data processing method) will be described with reference to FIG. 4 to FIG. 6.

Figure 4:
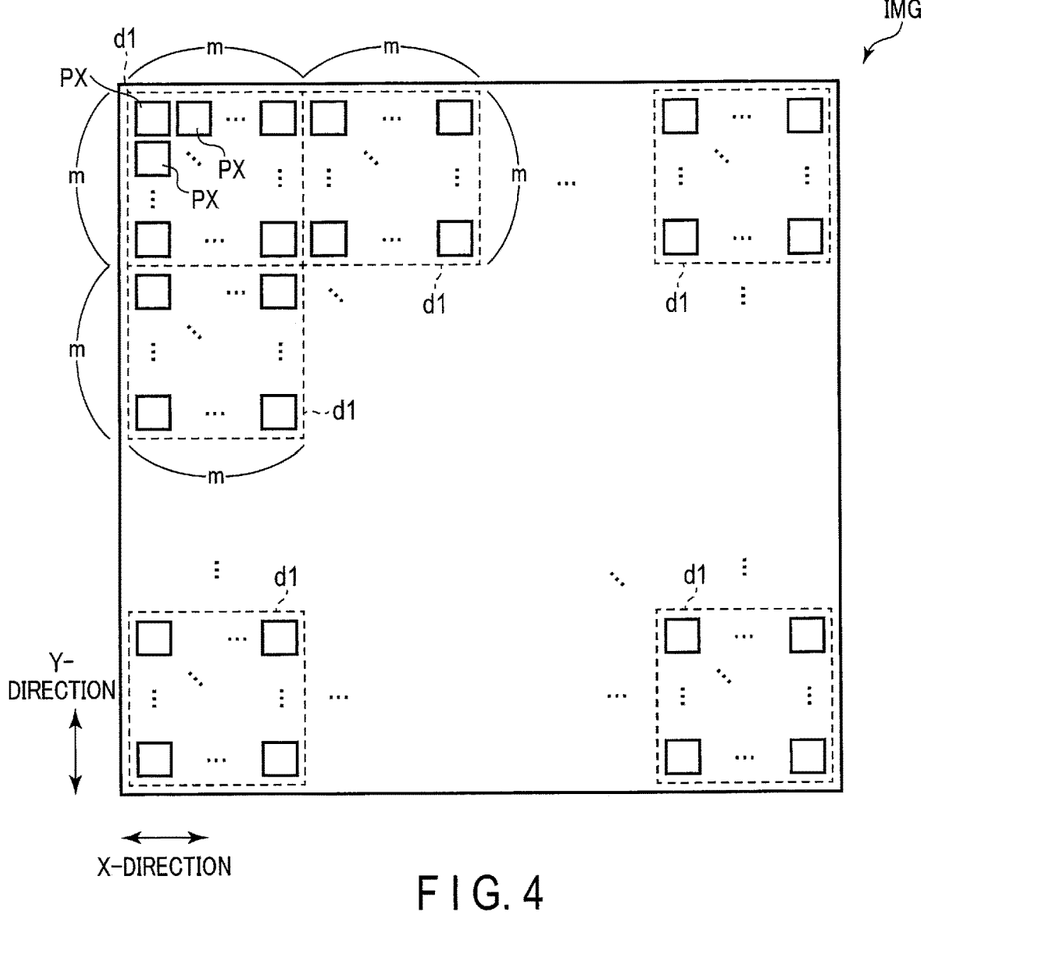
FIG. 4 is a diagram for explaining example of data provided to calculation processing of the processing device according to the embodiment.

FIG. 4 is a schematic diagram for explaining data provided to the processing device according to the present embodiment.

As shown in FIG. 4, one image data IMG is two-dimensional data formed by signals (pixel values) PX acquired from a plurality of pixels of the image sensor 90. The pixels are arranged in a pixel array of the image sensor 90 in the X-direction and the Y-direction. Each pixel value PX in the image data IMG has a value corresponding to light detected by a pixel at the corresponding coordinates. The pixel value PX is represented by a value of one or more bits. The image data IMG is not limited to data formed only of signals of an effective pixel region in the pixel array, but may be data formed of signals of the effective pixel region and ineffective pixel region of the pixel array.

The image data IMG is divided into a plurality of data items (data regions) d1, and provided to the processing device 110. Input data (also referred to as sample data or local patch data) d1 is data in which m×m (m is an integer of three or more) pixel values PX corresponding to m×m pixels are two-dimensionally arranged. Data d1 is provided from the input layer 101 to the processing device 110 in the data size of m×m units. Each data d1 may be formed of pixel values of the mutually different number of pixels or formed of pixels that are partly overlapped with each other.

Data d1 includes one or more channels. If one item of data d1 is data having independent information (a signal value) related to red (R), green (G), and blue (B), such as color image data of the RGB mode, data d1 includes a data unit for an R value, a data unit for a G value, and a data unit for a B value. Data d1 that includes a plurality of data units is provided to the processing device 110. A channel of data d1 corresponds to a data unit in accordance with the information that data d1 includes. Hereinafter, the number of channels of the data d1 is referred to as "channel number", and is represented by "K". For example, the channel number of the image data IMG of the RGB mode is three.

Figure 5:
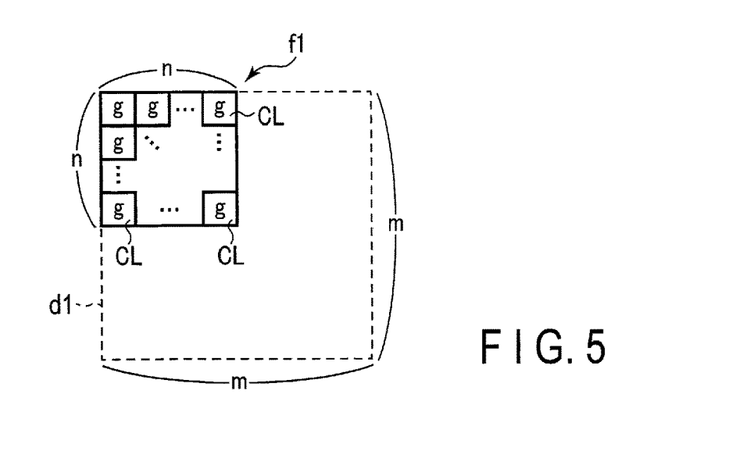
FIG. 5 is a diagram for explaining example of filter used in calculation processing of the processing device according to the embodiment.

FIG. 5 is a schematic diagram for explaining a filter used in calculation processing of the processing device according to the present embodiment.

As shown in FIG. 5, in the processing device 110 of the present embodiment, filter f1 of n×n size is used for calculation processing relative to the input data d1.

Filter f1 is a two-dimensional spatial filter having n×n elements (coefficients). For example, "n" and "m" has a relationship of "n=m−2", where n is an integer of three or more and less than m.

A cell CL (a square) of filter f1 is associated with a pixel (pixel value). Each cell CL is allocated with an element (coefficient) g for predetermined image processing. In accordance with various types of image processing such as noise cancellation, smoothing, sharpening, feature extracting, and edge detection, etc., different values of coefficients (weighting factors) g are allocated to each cell CL of filter f1.

For example, filter f1 includes one or more filter units. The number of filter units in a filter f1 may be discretionarily determined in accordance with the number of types (and the channel number) of image processing to be executed by one processing device 110. Hereinafter, the number of filter units in a filter f1 (also referred to as "filter number") is represented by "J".

Even for the same type of image processing, the value of weighting factor of a filter (filter unit) may vary for each processing device 110 in the hidden layer 102. In the neural network 100, the processing devices 110 may be allocated with respective filters f1 that have different weighting factors (matrix values). Each processing device 110 can execute calculation processing relative to data by using respective filters having different coefficients. Even if the number of channels of data d1 is two or more, a filter (filter unit) having the same weighting factor may be used for a data unit of each channel.

Figure 6:
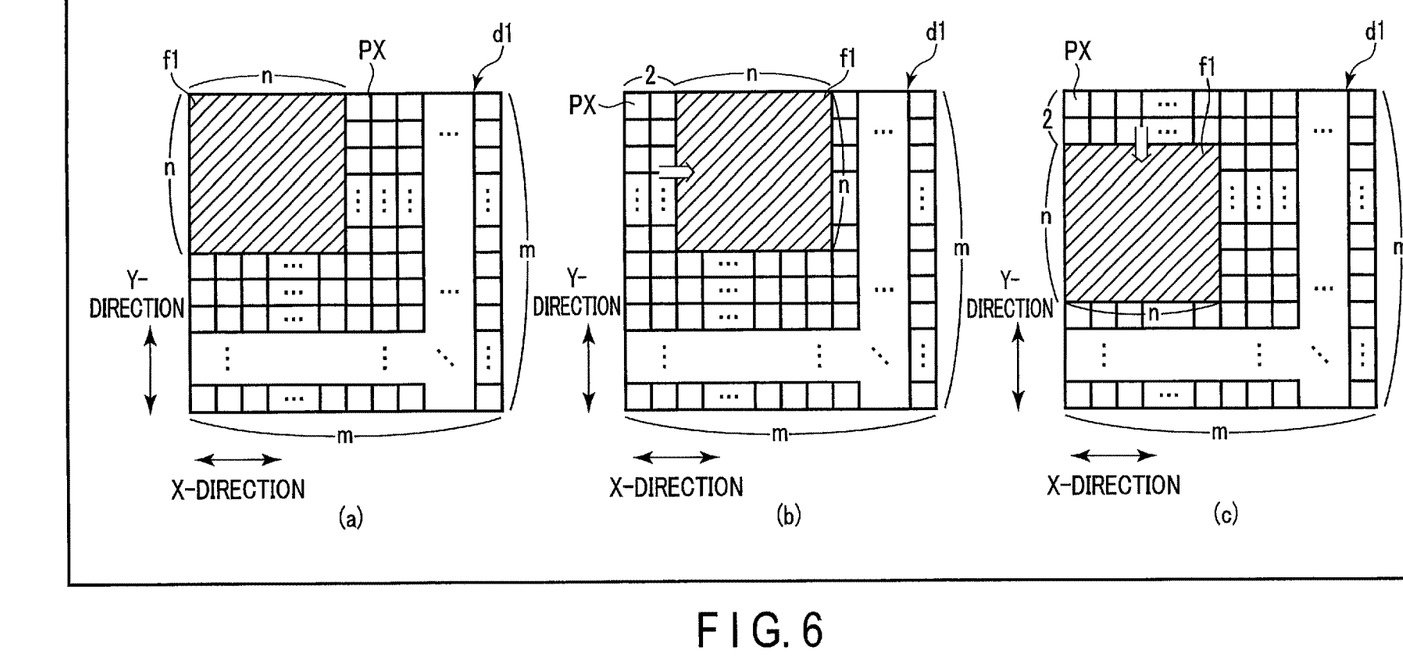
FIG. 6 is a diagram for explaining a concept of calculation processing of the processing device according to the embodiment.

FIG. 6 is a schematic diagram for explaining calculation processing using a filter relative to data in the processing device 110 according to the present embodiment.

As shown in (a) of FIG. 6, for the product-sum operation (convolution operation) on data d1 and filter f1 in the processing device 110, filter f1 of the size of n×n is overlapped with a region (n×n region) which has data d1 of the size of m×m.

As shown in (b) of FIG. 6, filter f1 is shifted by two pixels in the X-direction of the m×m data, and the product-sum operation for convolution is executed. Hereinafter, the shift amount of filter f1 when the filter is moved in parallel relative to data d1 is referred to as a stride value (or, merely "stride").

As shown in (c) of FIG. 6, the stride value of filter f1 is shifted by two pixels in the Y-direction of the m×m data, and the product-sum operation for convolution is executed.

As described above, in the present embodiment, the processing device 110 in the neural network acquires a result of the product-sum operation on data d1 of the size of m×m and filter f1 of the size of n×n under the condition in which the stride value is set to two.

In the present embodiment, the processing device 110 executes preprocessing using the first matrix Mat 1 relative to data d1, preprocessing using the second matrix Mat 2 relative to filter f1, and post-processing using the third matrix Mat 3 relative to the result of the product-sum operation on preprocessed data d2 and preprocessed filter f2.

Via this processing, in the processing device 110 of the present embodiment, calculation processing equivalent to the product-sum operation on data d1 of the size of m×m and filter f1 of the size of n×n, under the condition in which the stride value is set to two, can be executed.

Via the calculation processing including the conversion of such data and a filter, the processing device (and the image data processing method) of the present embodiment can obtain the same result as the general product-sum operation on data and a filter with a relatively lesser amount of calculation.

Accordingly, the processing device of the present embodiment can decrease the calculation amount in the convolutional neural network.

In the following, the operation of the processing device of the present embodiment, various types of calculation processing (image data processing method or image recognition method) by the processing device of the present embodiment will be described in further detail.

(3) Operation Example

An operation example (data processing method) of the processing device according to the present embodiment will be explained with reference to FIG. 7 to FIG. 9, based on detailed examples.

Figure 7:
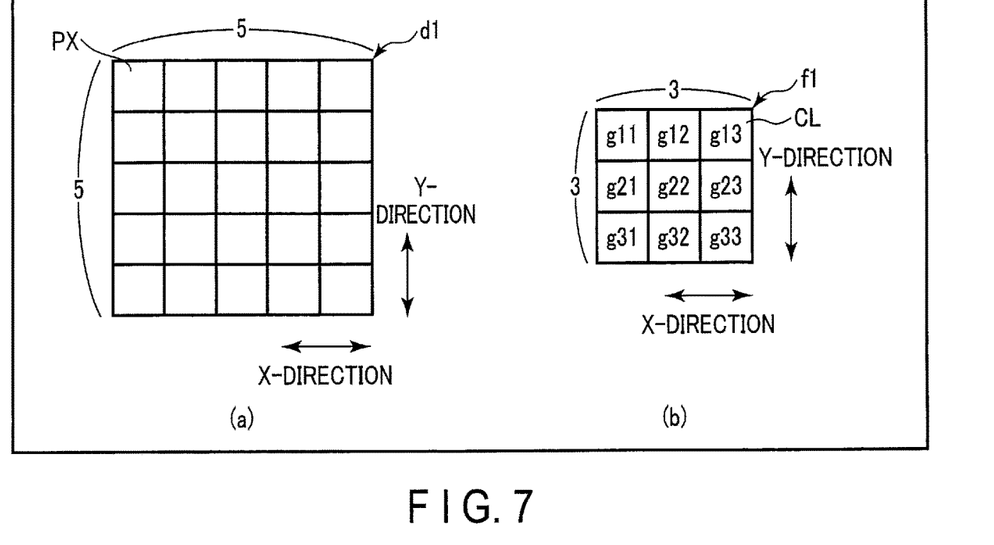
FIG. 7 is a diagram for explaining an operation example of the processing device according to the embodiment.

FIG. 7 is a schematic diagram showing an example of data d1 and filter f1 used for calculation processing in the convolutional neural network 100 of this example.

In this example, as shown in (a) of FIG. 7, data d1 is data corresponding to a pattern in which 25 pixels are arranged in a two-dimensional region of the size of 5×5. Data d1 has the data size of 5×5. A value of each cell in data d1 corresponds to a pixel value (signal) PX according to a detection result of a pixel of the image sensor 90.

Data d1 is provided from the input layer 101 to the processing device 110 of the present embodiment. Data d1 has the channel number of K (K≤1).

In this example, as shown in (b) of FIG. 7, filter (data) f1 has a pattern in which 9 cells CL are arranged in a two-dimensional region of the size of 3×3.

In filter f1 having the filter size of 3×3, each cell CL is allocated with a weighting factor g (g11, g12, . . . , g32, g33). The value of the weighting factor g is set in accordance with the image processing to be executed by the use of the filter. Filter f1 has K (K≤1) filter units in accordance with the number of (types of) image processing to be executed by a processing device 110.

Figure 8:
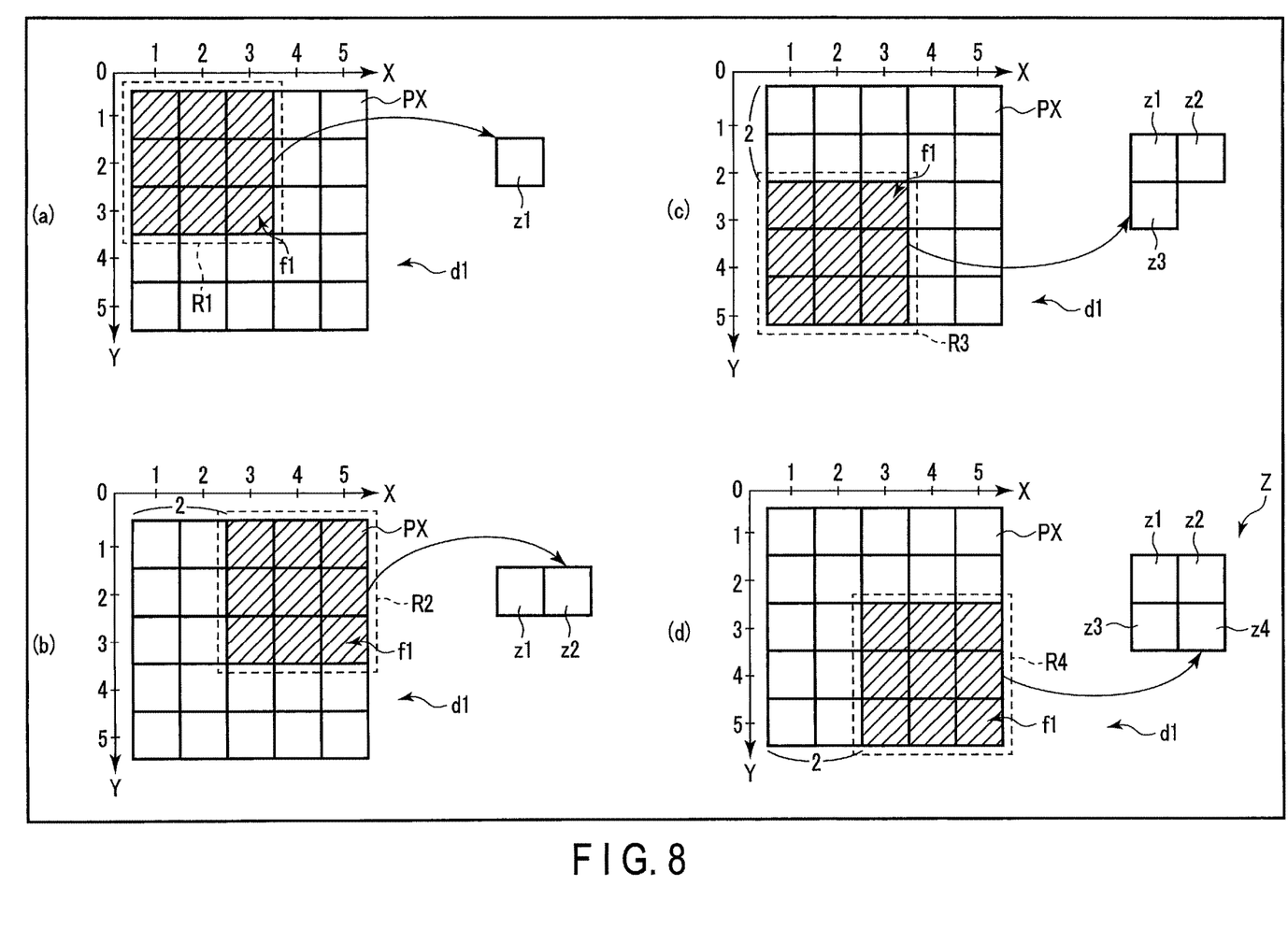
FIG. 8 is a diagram for explaining another operation example of the processing device according to the embodiment.

FIG. 8 is a schematic diagram for explaining the product-sum operation on data d1 and filter f1 in the processing device 110 according to the present embodiment.

As described above, in the present embodiment, for the product-sum operation on data d1 of the size of 5×5 and filter f1 of the size of 3×3, the stride value of 3×3 filter f1 relative to 5×5 data d1 is set to "2".

As shown in (a) of FIG. 8, at a starting point of the product-sum operation on 5×5 data d1 and 3×3 filter f1, the product-sum operation (convolution operation) on an overlapped portion between data d1 and filter f1 (hatched portion in FIG. 8) is executed. Via this processing, a value z1 (hereinafter referred to as a convolution value) of a region R1 (hereinafter referred to as a convolution region) is obtained. For example, in (a) of FIG. 8, the target pixel of the image processing is a pixel at a position where X=2 and Y=2 (at a position in the X-Y plane) within data d1.

If the stride value is 2, filter f1 is shifted by two pixels in the X-direction of data d1, as shown in (b) of FIG. 8. The product-sum operation is executed on an overlapped portion between data d1 and filter f1 in (b) of FIG. 8. Via this processing, a convolution value z2 of a convolution region R2 is obtained. For example, in (b) of FIG. 8, the target pixel of the image processing is a pixel at coordinates where X=4 and Y=2 within data d1.

As shown in (c) of FIG. 8, filter f1 is shifted by two pixels from the position of the filter of (a) of FIG. 8 in the Y-direction of data d1. The product-sum operation is executed on an overlapped portion between data d1 and filter f1 in (c) of FIG. 8. Via this processing, a convolution value z3 of a convolution region R3 is obtained. For example, in (c) of FIG. 8, the target pixel (central pixel) of the image processing is a pixel at coordinates where X=2 and Y=4 within data d1.

As shown in (d) of FIG. 8, filter f1 is shifted by two pixels from the position of (c) of FIG. 8 in the X-direction. The shift direction of filter f1 in (d) of FIG. 8 is a diagonal direction parallel to the X-Y plane from the starting position (see (a) of FIG. 8) of the product-sum operation. The product-sum operation is executed on an overlapped portion between data d1 and filter f1 in (d) of FIG. 8. Via this processing, a convolution value z4 of a convolution region R4 is obtained. For example, in (d) of FIG. 8, the target pixel of the image processing is a pixel at coordinates where X=4 and Y=4 within data d1.

Via these product-sum operations, the calculation result (also referred to as output data) of the size of 2×2 is obtained. As a result, the result (Z) of the product-sum operation on data of the size of 5×5 and a filter of the size of 3×3 in the case where the stride value is set to two is obtained.

The order of product-sum operations is not limited to the order from (a) to (b), to (c) and to (d) of FIG. 8.

In the processing device 110 of the present embodiment, the processing circuits 111, 112, 113, and 114 shown in FIG.

3 execute calculation processing and conversion processing of data and a filter, described below with reference to FIG. 9.

Via the processing, the result equivalent to the calculation result by the processing of FIG. 8 can be obtained by the processing device 110 of the present embodiment.

<Processing Flow>

Figure 9:
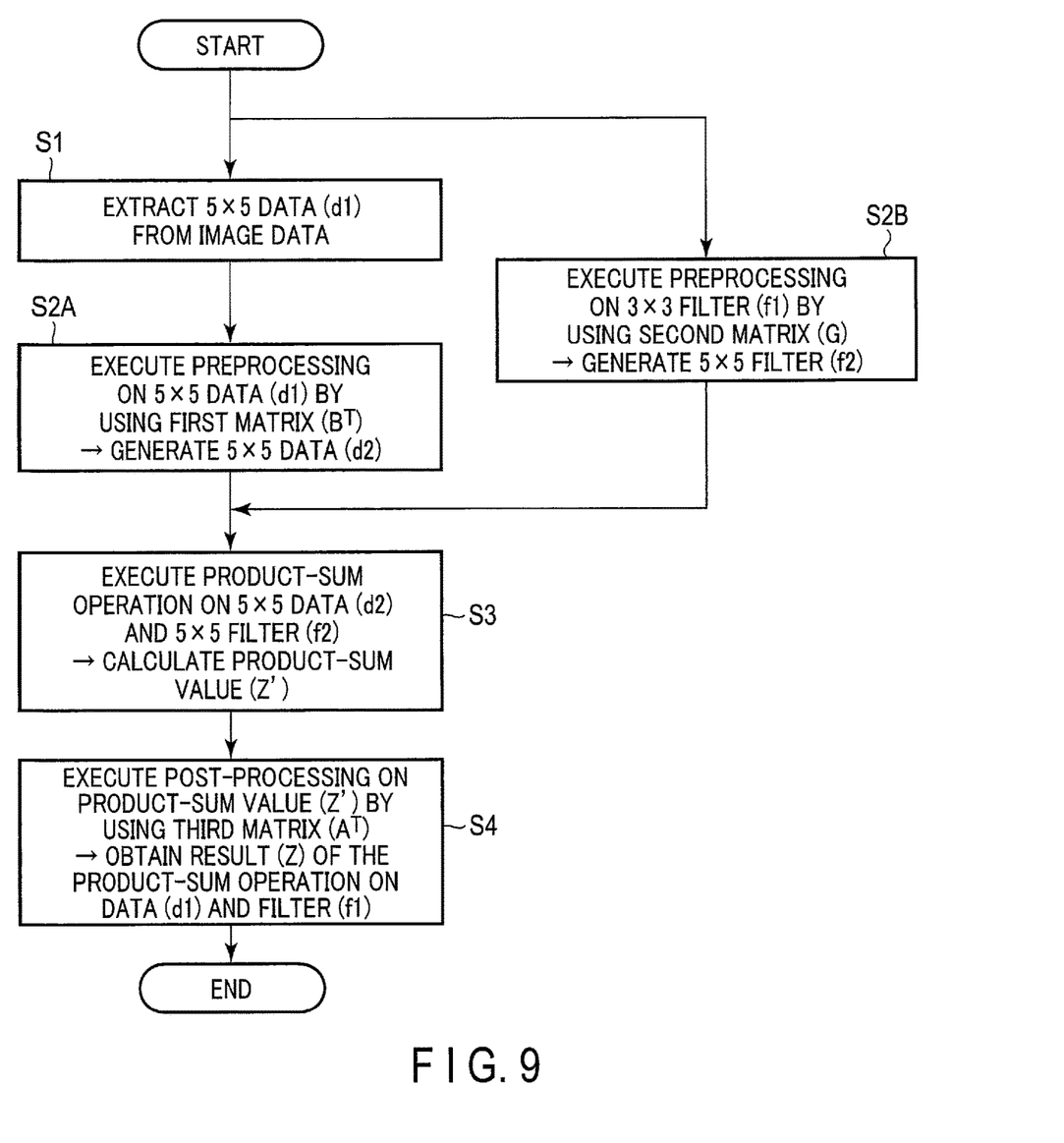
FIG. 9 is a flowchart for explaining an operation example of the processing device according to the embodiment.

FIG. 9 is a flowchart of the various types of processing (image data processing method) by the processing device according to the embodiment.

<S1>

The image sensor 90 generates image data IMG corresponding to an object OBJ. The generated image data IMG is transmitted from the image sensor 90 to the image recognition system 1.

The image recognition system 1 initiates image processing using the image data IMG. The image data IMG is provided to the convolutional neural network (machine learning device) 100 of the GPU10.

In calculation processing of the image data IMG at the convolutional neural network 100, data d1 of the size of m×m (5×5 in this example) is extracted from the image data IMG by the processing device 118 of the input layer 101. Data d1 of the size of m×m is provided to the processing device 110 in the hidden layer 102. The channel number K of data d1 is 1 or more.

<S2A>

The first preprocessing circuit 111 receives data d1. In the processing device 110 of the present embodiment, the first preprocessing circuit 111 executes preprocessing (conversion) relative to 5×5 data d1 (each pixel value in data d1) by using the aforementioned matrix Mat1, which is a matrix "$B^T$" indicated below as equation Eq1.

$$B^T = \begin{bmatrix} 0 & 1 & 0 & 0 & 0 \\ 1 & 0 & 1 & 0 & 0 \\ 1 & 0 & -1 & 0 & 0 \\ 1 & 0 & 0 & 0 & -1 \\ 0 & 0 & 0 & 1 & 0 \end{bmatrix} \quad \text{(Eq1)}$$

Via this processing, data d1 is converted to data d2.

Specifically, if the channel number K of data d1 is 1, data d1 is converted to data d2 by the calculation processing indicated below as equation Eq2.

$$d2 = B^T d1 B \quad \text{(Eq2)}$$

In equation Eq2, "B" is a transposed matrix of "$B^T$". The matrix "B" is indicated below as equation Eq3.

$$B = \begin{bmatrix} 0 & 1 & 1 & 1 & 0 \\ 1 & 0 & 0 & 0 & 0 \\ 0 & 1 & -1 & 0 & 0 \\ 0 & 0 & 0 & 0 & 1 \\ 0 & 0 & 0 & -1 & 0 \end{bmatrix} \quad \text{(Eq3)}$$

The matrix "$B^T$", the matrix "B", and data d1 each are a matrix of 5×5, and accordingly, data d2 has the size of 5×5.

If the channel number of data d1 is K>1, the calculation processing of preprocessing relative to data d1 is executed on all of k∈[0, K) related to the channel number, as indicated as equation Eq4. In equation Eq4, "k" is a value (an integer) indicating an element of a set of elements of K.

$$d2[k] = B^T d1[k] B \quad \text{(Eq4)}$$

The size of data d2 after preprocessing at one channel is 5×5. The size of data d2 is represented as (K, 5, 5) (K≥1).

The first preprocessing circuit 111 outputs the preprocessed data (converted data) d2 to the product-sum operation circuit 113.

<S2B>

The second preprocessing circuit 112 receives filter (data) f1. In the processing device 110 of the present embodiment, the second preprocessing circuit 112 executes preprocessing (conversion) relative to filter (data) f1 of the size of n×n (3×3 in this example). For example, the preprocessing (S2B) relative to filter f1 is preferably executed at a timing prior to the preprocessing (S2A) relative to data d1 or a timing prior to acquisition of the image data IMG. The preprocessing (S2A) on data d1 and the preprocessing (S2B) on a filter may be executed substantially in parallel in time.

The second preprocessing circuit 112 executes the preprocessing on filter f1 of the size of 3×3 (each weighting factor g set to each cell CL of filter f1), by using the aforementioned matrix Mat 2 which is a matrix "G" indicated as equation Eq5.

$$G = \begin{bmatrix} 0 & 1 & 0 \\ \frac{1}{2} & 0 & \frac{1}{2} \\ \frac{1}{2} & 0 & -\frac{1}{2} \\ 0 & 0 & 1 \\ 0 & 1 & 0 \end{bmatrix} \quad \text{(Eq5)}$$

Via this processing, filter f1 is converted to filter (data) f2.

Specifically, filter f1 is converted to filter f2 by the calculation processing indicated below as equation 6 Eq6. In equation Eq6, the channel number K is 1, and the number of filter units J is 1.

$$f2 = G f1 G^T \quad \text{(Eq6)}$$

In equation Eq6, "$G^T$" is a transposed matrix of "G". The matrix "$G^T$" is indicated as equation Eq7.

$$G^T = \begin{bmatrix} 0 & \frac{1}{2} & \frac{1}{2} & 0 & 0 \\ 1 & 0 & 0 & 0 & 1 \\ 0 & \frac{1}{2} & -\frac{1}{2} & 1 & 0 \end{bmatrix} \quad \text{(Eq7)}$$

Via the calculation processing on a 5×3 matrix (G), a 3×3 filter (f1), and a 3×5 matrix ($G^T$), filter f2 subjected to the preprocessing becomes the size of 5×5. Each weighting factor of 5×5 filter f2 is set to be a value in accordance with the calculation result on the weighting factors g11 to g33 of filter f1 and each element in matrices $G^T$ and G.

In the case where the channel number of data d1 is K>1, and the filter number of filter f1 is J>1, the calculation processing of preprocessing relative to filter f1 is executed on all of j∈[0, J) and k∈[0, K) related to the channel number and the filter number, as indicated as equation Eq8. In equation Eq8, "j" is a value (an integer) indicating an element of a set of elements of J.

$$f2[j,k] = G f1[j,k] G^T \quad \text{(Eq8)}$$

Via this processing, matrix conversion is performed on filter f1.

The size of preprocessed filter f2 is represented as (J, K, 5, 5), where "J" is an integer of one or more, and "K" is an integer of one or more.

The second preprocessing circuit 112 outputs the preprocessed filter (converted filter) f2 to the product-sum operation circuit 113.

Thereafter, the processing steps of S3 and S4 are executed by using the preprocessed data d2 and the preprocessed filter f2.

<S3>

The product-sum operation circuit 113 receives the preprocessed data d2 and the preprocessed filter f2. In the processing device 110 of the present embodiment, the product-sum operation circuit 113 executes the product-sum operation on the preprocessed data d2 and the preprocessed filter f2.

The product-sum operation is indicated as equation Eq9.

$$Z'[j] = \sum_k f2[j] \odot d2 \quad \text{(Eq9)}$$

In the product-sum operation of equation Eq9, a product between each element of data d2 and each element g of filter f2 is calculated, and the sum of products for the channel number of input data d1 is calculated. The product-sum operation circuit 113 obtains a calculation result (C1) of the product-sum operation.

A value indicating the calculation result (C1) of equation Eq9 (hereinafter referred to as a product-sum value) Z' has the size of 5×5, and is represented as (J, 5, 5) with regard to the filter number J.

The product-sum operation circuit 113 outputs the calculation result Z' (C1) of equation Eq9 to the post-processing circuit 114.

<S4>

The post-processing circuit 114 receives the calculation result Z' (C1). In the processing device 110 of the present embodiment, the post-processing circuit 114 executes post-processing relative to the result C1 of the $$A^T = \begin{bmatrix} 1 & 1 & 1 & 0 & 0 \\ 0 & 1 & -1 & -1 & 1 \end{bmatrix} \quad \text{(Eq10)}$$

product-sum operation (product-sum value Z') by using the third matrix Mat3 which is a matrix "$A^T$" indicated below as equation Eq10.

Via this processing, a calculation result subsequently equivalent to the result of the product-sum operation on data d1 and filter (data) f1 is obtained.

Specifically, a product-sum value Z' is converted to a calculation result equivalent to the result of the product-sum operation on data d1 and filter f1, via the calculation processing indicated below as equation Eq11. In equation Eq11, J=1.

$$Z = A^T Z' A \quad \text{(Eq11)}$$

In equation Eq11, "A" is a transposed matrix of "$A^T$". The matrix "A" is indicated below as equation Eq12.

$$A = \begin{bmatrix} 1 & 0 \\ 1 & 1 \\ 1 & -1 \\ 0 & -1 \\ 0 & 1 \end{bmatrix} \quad \text{(Eq12)}$$

If J>1, the conversion of a product-sum value Z' is executed for all of j∈ [0, J), as indicated in equation Eq13.

$$Z[j] = A^T Z'[j] A \quad \text{(Eq13)}$$

Via the calculation processing on a 2×5 matrix ($A^T$), the calculation result (Z') of the size of 5×5, and a 5×2 matrix (A), the calculation result Z after the post-processing becomes data (a matrix) of the size of 2×2. As described above, the processing device 110 can obtain data Z (Z[m]) of the size of 2×2 as the calculation result.

The processing device 110 transmits the calculation result Z to the processing device in the subsequent layer (other hidden layer or output layer).

The calculation processing including the conversion of provided data d1 and conversion of filter f1 by the processing device 110 of the present embodiment is completed.

In the present embodiment, the neural network 100 executes at least one of inference, learning, and classification related to the image data IMG by using the calculation result Z.

The image recognition system 1 of the present embodiment can execute recognition processing of an object in the image data IMG, based on the result obtained by inference/learning by the neural network that includes the processing device 110 using the calculation result Z.

In the case where other data (hereinafter referred to as data dx) consecutive to data d1 in the image data IMG is newly provided to the processing device 110 of the present embodiment, the aforementioned calculation processing is executed on newly provided data.

A filter used for the calculation processing relative to the new data dx is the same as filter f1 and filter f2 used for the calculation processing relative to data d1. Thus, the preprocessing relative to filter f1 using the matrix G (Mat 2) does not necessarily have to be executed again in the calculation processing relative to data dx.

As described above, the image data processing by the processing device according to the embodiment is completed.

(4) Conclusion

In an example of the convolutional neural network of the general image recognition system, 4×4 data and a 3×3 filter are used for the calculation processing by one processing device. The product-sum operation (convolution operation) on the 4×4 data and the 3×3 filter is executed. In the product-sum operation for convolution, the stride value is set to "1".

In this case, calculation is executed 36 times by one processing device. If the channel number of data is K, and the number of types of image processing (types of filters) to be executed is J, the calculation amount of one processing device is 36×J×K times.

In the case where the stride value is two, the general product-sum operation using 5×5 data and a 3×3 filter is represented by equation Eq14 below.

$$\sum_{ky=0}^{2} \sum_{kx=0}^{2} \sum_{0} f1[j, k, ky, kx] \times d1[k, 2*r+ky, 2*c+kx] \quad \text{(Eq14)}$$

In equation Eq14, "ky" is a value related to the size of filter f1 in the Y-direction, "kx" is a value related to the size of filter f1 in the X-direction, "r" is a value related to a row of data d1, and "c" is a value related to a column of data d1.

In the present embodiment, the processing device included in the neural network executes calculation processing that is substantially equivalent to the product-sum operation for convolution operation by using m×m (e.g., 5×5) data d1 and n×n (e.g., 3×3, where n=m−2 in this example) filter f1. The stride value of a filter applied to input data in the product-sum operation of the processing device according to the present embodiment is set to 2.

In the present embodiment, various types of conversion processing relative to data, filter (data), and the result of product-sum operation are executed using a predetermined matrices Mat1, Mat2, and Mat3 (for example, equations Eq1, Eq2 and Eq3).

The calculation result Z obtained from FIG. 9 and equations Eq1 to Eq13 is equal to the calculation result obtained from equation Eq14.

In the present embodiment, the number of times of product-sum operations except the preprocessing (S2A, S2B) to data d1 and filter f1 and the post-processing (S4) to the product-sum value is 5×5×J×K (=25×J×K) times, as indicated by equation Eq9.

The relative ratio of the number of times of product-sum operations (25×J×K times) in the present embodiment to the number of times of product-sum operations in the general convolutional product-sum operations (36×J×K times) is 25/36 (=1/1.44).

The number of times of product-sum operations executed during the preprocessing relative to filter f1 in the present embodiment is (5×3×3+5×5×3)×J×K (=120×J×K) times, based on equations Eq6 and Eq8.

The preprocessing to filter f1 does not necessarily need to be executed concurrently with the inference/learning processing. Since the preprocessing to filter f1 is executed in advance (for example, prior to acquisition/execution processing of image data IMG, or prior to preprocessing of data d1), the calculation processing to filter f1 is not executed during the inference/learning processing.

Thus, the number of times of calculations to filter f1 is not substantially increased during the inference/learning processing to the image data IMG.

The number of times of product-sum operations executed during the preprocessing relative to data d1 is (5×5×5+5×5×5)×K (=250×K) times, based on equations Eq2 and Eq4.

However, the elements of matrices $B^T$ (Eq1) and B (Eq3) are "1" or "−1". Thus, the elements of data d2 can be calculated by addition and subtraction to the elements of data d1. Accordingly, the number of times of substantial calculations executed during the preprocessing to data d1 is 50×K times.

The value of data d1 varies according to an input subjected to inference or learning. Thus, the preprocessing to data d1 cannot be executed prior to the inference/learning processing, and is executed during the inference/learning processing.

Based on the aforementioned equations, the number of times of the product-sum operations in the preprocessing to data d1 does not need a value of the number of filter units J as a coefficient. Accordingly, if one processing device 110 executes a great number of types of image processing, the number of times of calculations for the preprocessing to data d1 can be practically ignored.

As described above, the processing device 110 of the present embodiment can reduce the load caused by the calculation amount and the calculation processing. In addition, the processing device 110 of the present embodiment can improve the speed of the calculation processing.

Furthermore, the processing device 110 of the present embodiment can suppress an increase of the load of a processor caused by the calculation processing accompanied by an increase of the data size.

The size of input data targeted by one processing device is 5×5. Accordingly, in the processing device 110 of the present embodiment, the number of samplings of input data relative to one image data can be reduced in comparison with the case where the calculation processing is executed using 4×4 data extracted from the image data.

Therefore, according to the processing device and data (image data) processing method of the present embodiment, the properties of the processing device can be improved.

(5) Modification

EXAMPLE 1

In the present embodiment, each calculation processing of FIG. 9 and equations Eq1 to Eq13 may be provided or implemented as a program.

For example, a program of data processing method of the present embodiment is stored in at least one of the storage medium 99, the memory region of the GPU 10, the memory region of the CPU 20, and the memory 70 of the computer system 1. The program code corresponding to respective S1 to S4 of FIG. 9 is described in the program.

In the computer system (image recognition system) 1 of FIG. 1, the GPU 10 (or the CPU 20) reads the program in the storage medium 99, and executes program codes corresponding to the respective S1 to S4 of FIG. 9.

Via this processing, the calculation processing relative to image data of the present embodiment is executed by using data of the size of m×m (e.g., 5×5) and a filter of the size of n×n (e.g., 3×3).

Even in the case where the image data processing method of the present embodiment is provided and implemented as a program, the convolutional product-sum operations can be executed in the neural network with a relatively lesser amount of calculations.

EXAMPLE 2

A scalar coefficient may be multiplied by the aforementioned matrices $B^T$, G and $A^T$.

In the input layer 101 of the convolutional neural network, there is a case where row/column conversion of image data is performed. In accordance with the processing executed on data, the arrangements of rows of matrix $B^T$ or the arrangements of columns of matrix $B^T$ may be replaced to the extent that the equivalence of calculation is maintained.

Similarly, in accordance with the processing executed on data and/or a filter, the arrangements of rows of matrix G or the arrangements of columns of matrix G may be replaced. In addition, in accordance with the processing executed on data and/or a filter, the arrangements of rows of matrix $A^T$ or the arrangements of columns of matrix $A^T$ may be replaced.

(6) Others

The processing device of the present embodiment, the computer system including the processing device of the present embodiment, and the storage medium that stores the data processing method of the present embodiment may be applied to a smartphone, a cellular phone, a personal computer, a digital camera, a vehicle-installed camera, a surveillance camera, a security system, an AI apparatus, a library of a system (database), and a satellite, etc.

In the aforementioned embodiment, the processing device and the data processing method according to the present embodiment are adopted to the convolutional neural network in the image recognition system. However, the processing device and the data processing method according to the present embodiment can be adopted to various types of computer systems including the convolutional neural network, and various types of data processing methods executing calculation processing by the convolutional neural network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A computer system for processing input image data, comprising:
a memory; and
a processor configured to execute an operation of a neural network using data stored in the memory, the neural network comprising a plurality of processing devices including a first processing device and a second processing device,
the first processing device configured to
receive input data including the image data;
execute first processing using a first matrix to first data of a size of 5×5 within the received input data to generate second data;
execute second processing using a second matrix to third data of a size of 3×3 to generate fourth data;
execute a product-sum operation on the generated second data and the generated fourth data;
execute third processing using a third matrix on a result of the product-sum operation on the second data and the fourth data to obtain a first value corresponding to a result of a product-sum operation on the first data and the third data; and
output the obtained first value to the second processing device,
wherein:
the first matrix is represented by equation (P1):

$$B^T = \begin{bmatrix} 0 & 1 & 0 & 0 & 0 \\ 1 & 0 & 1 & 0 & 0 \\ 1 & 0 & -1 & 0 & 0 \\ 1 & 0 & 0 & 0 & -1 \\ 0 & 0 & 0 & 1 & 0 \end{bmatrix}, \quad (P1)$$

and
the second matrix is represented by equation (P2):

$$G = \begin{bmatrix} 0 & 1 & 0 \\ \frac{1}{2} & 0 & \frac{1}{2} \\ \frac{1}{2} & 0 & -\frac{1}{2} \\ 0 & 0 & 1 \\ 0 & 1 & 0 \end{bmatrix}. \quad (P2)$$

2. The computer system according to claim 1, wherein:
the third matrix used by the first processing device is represented by equation (P3):

$$A^T = \begin{bmatrix} 1 & 1 & 1 & 0 & 0 \\ 0 & 1 & -1 & -1 & 1 \end{bmatrix}. \quad (P3)$$

3. The computer system according to claim 1, wherein:
the first value obtained by the first processing device corresponds to a result of the product-sum operation on the first data and the third data under a condition where a stride value of the third data relative to the first data is set to 2.

4. The computer system according to claim 1, further comprising circuitry configured to perform
at least one of inference, learning, and classification related to the input data based on the first value obtained by the first processing device.

5. The computer system according to claim 1, wherein:
when the first data is represented by "d", the first matrix is represented by "$B^T$", and a transposed matrix of the first matrix is represented by "B", a result of the first processing executed by the first processing device is represented by "$B^T dB$".

6. The computer system according to claim 1, wherein:
when the third data is represented by "f", the second matrix is represented by "G", and a transposed matrix of the second matrix is represented by "$G^T$", a result of the second processing executed by the first processing device is represented by "$GfG^T$".

7. The computer system according to claim 1, wherein:
when a result of the product-sum operation on the second data and the fourth data is represented by "Z", the third matrix is represented by "$A^T$", and a transposed matrix of the third matrix is represented by "A", the first value obtained by the first processing device is represented by "$A^T ZA$".

8. The computer system according to claim 1, wherein:
the second data generated by the first processing device and the fourth data generated by the first processing device each have a size of 5×5.

9. The computer system according to claim 1, wherein:
the first value obtained by the first processing device is data of a size of 2×2.

10. The computer system according to claim 1, wherein:
the first processing device is further configured to replace a plurality of rows or a plurality of columns of the first matrix to execute the first processing, and
the first processing device is further configured to replace a plurality of rows or a plurality of columns of the second matrix to execute the second processing.

11. A data processing method of a computer system for processing input image data, the computer system including a memory and a processer configured to execute an operation of a neural network using data stored in the memory, the neural network comprising a plurality of processing devices including a first processing device and a second processing device, the data processing method comprising:

receiving input data including the image data;

executing, by the first processing device, first processing using a first matrix indicated as an equation (Q1) to first data of a size of 5×5 within the received input data to generate second data;

$$B^T = \begin{bmatrix} 0 & 1 & 0 & 0 & 0 \\ 1 & 0 & 1 & 0 & 0 \\ 1 & 0 & -1 & 0 & 0 \\ 1 & 0 & 0 & 0 & -1 \\ 0 & 0 & 0 & 1 & 0 \end{bmatrix} \quad (Q1)$$

executing, by the fir processing device, second processing using a second matrix indicated as an equation (Q2) to third data of a size of 3×3 to generate fourth data;

$$G = \begin{bmatrix} 0 & 1 & 0 \\ \frac{1}{2} & 0 & \frac{1}{2} \\ \frac{1}{2} & 0 & -\frac{1}{2} \\ 0 & 0 & 1 \\ 0 & 1 & 0 \end{bmatrix} \quad (Q2)$$

executing, by the first processing device, a product-sum operation on the generated second data and the generated fourth data;

executing, by the first processing device, third processing using a third matrix on a result of the product-sum operation on the second data and the fourth data to obtain a first value corresponding to a result of a product-sum operation on the first data and the third data; and outputting, by the first processing device, the obtained first value to the second processing device.

12. The data processing method according to claim 11, wherein
the third matrix is represented by equation (Q3):

$$A^T = \begin{bmatrix} 1 & 1 & 1 & 0 & 0 \\ 0 & 1 & -1 & -1 & 1 \end{bmatrix}. \quad (Q3)$$

13. The data processing method according to claim 11, wherein:
the first value corresponds to a result of the product-sum operation on the first data and the third data under a condition where a stride value of the third data relative to the first data is set to 2.

14. The data processing method according to claim 11, further comprising
executing, by circuitry, at least one of inference, learning, and classification related to the input data based on the first value.

15. The data processing method according to claim 11, wherein:
when the first data is represented by "d" the first matrix is represented by "$B^T$", and a transposed matrix of the first matrix is represented by "B", a result of the first processing is represented by "$B^T dB$".

16. The data processing method according to claim 11, wherein:
when the third data is represented by "f", the second matrix is represented by "G", and a transposed matrix of the second matrix is represented by "$G^T$", a result of the second processing is represented by "$GfG^T$".

17. The data processing method according to claim 11, wherein:
when a result of the product-sum operation on the second data and the fourth data is represented by "Z", the third matrix is represented by "$A^T$", and a transposed matrix of the third matrix is represented by "A", the first value is represented by "$A^T ZA$".

18. The data processing method according to claim 11, wherein:
the second data and the fourth data each have a size of 5×5.

19. The data processing method according to claim 11, wherein:
the first value is data of a size of 2×2.

20. The data processing method according to claim 11, wherein:
the first processing is executed by replacing a plurality of rows or a plurality of columns of the first matrix, and the second processing is executed by replacing a plurality of rows or a plurality of columns of the second matrix.

* * * * *